United States Patent

[11] 3,583,645

[72] Inventors Gregory J. Murray;
 Fred K. Tarrant, both of Saratoga Springs, N.Y.
[21] Appl. No. 831,453
[22] Filed June 9, 1969
[45] Patented June 8, 1971
[73] Assignee Tarrant Manufacturing Company
 New York, N.Y.

[54] CONVEYOR-TYPE HYDRAULIC-POWERED ENDGATE SPREADER
 8 Claims, 7 Drawing Figs.
[52] U.S. Cl. .................................................. 239/657,
 239/672, 239/681, 239/666
[51] Int. Cl. ....................................................... E01c 19/20
[50] Field of Search............................................ 239/650,
 657, 660, 665, 666, 672, 674, 676, 681, 687;
 298/23; 214/508, 509, 83.18, 83.36; 198/184,
 199, 195; 116/71, 114; 340/244, 246; 222/349, 350

[56] References Cited
 UNITED STATES PATENTS

| | | | |
|---|---|---|---|
| 533,252 | 1/1895 | Thomas | 222/349 |
| 848,519 | 3/1907 | Versteeg | 340/246 |
| 1,508,210 | 9/1924 | Bangert | 239/666X |
| 1,637,601 | 8/1927 | Bussey | 222/350 |
| 1,961,193 | 6/1934 | Brumbaugh | 298/23UX |
| 2,642,881 | 6/1953 | Buchholz | 340/246X |
| 3,055,489 | 9/1962 | Schwartz et al. | 198/208 |
| 3,189,355 | 6/1965 | Swenson et al. | 239/687X |
| 3,300,068 | 1/1967 | Tarrant | 214/508X |
| 3,360,105 | 12/1967 | Pelzer | 198/129 |
| 3,438,585 | 4/1969 | Buchmann | 239/665 |

FOREIGN PATENTS

| | | | |
|---|---|---|---|
| 61,813 | 9/1912 | Switzerland | 298/23(R) |

Primary Examiner—M. Henson Wood, Jr.
Assistant Examiner—Edwin D. Grant
Attorney—Paul A. Frank ABSTRACT: A material spreader for a dump truck is pivotally attached to the rear of the truck body in a normally fixed position and has a transverse bar flight conveyor and a spinner assembly which is self-leveling. The truck tailgate forms an end wall when the truck is used for spreading material and has side shields to contain such material. A cover for the conveyor in closed position provides a smooth surface to permit the truck to be used for conventional hauling, dumping, etc., and in open position is attachable to the end gate to uncover the conveyor. A pressure plate on the cover operates an indicator in the cab to signal when the spreader needs more material.

Inventors
Fred K. Tarrant Sr.
Gregory J. Murray
by Paul A. Frank
Their Attorney

Inventors
Fred K. Tarrant Sr,
Gregory J. Murray
by Paul A. Frank
Their Attorney

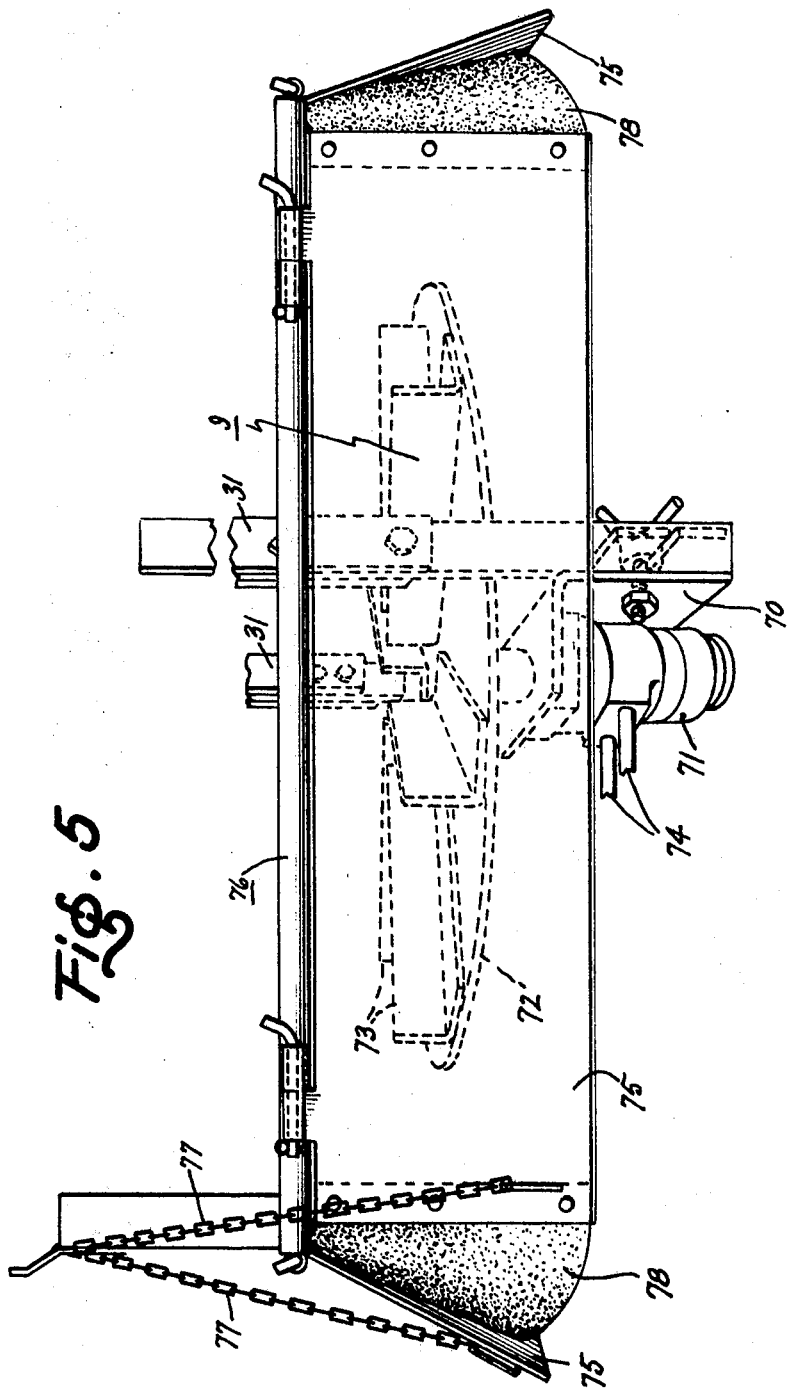

CONVEYOR-TYPE HYDRAULIC-POWERED ENDGATE SPREADER

This invention relates to a material spreader to be attached at the rear of a dump truck for emptying the truck of sand, salt, or other granular material, and in particular to such a spreader which may be attached to the dump truck in a permanent manner while permitting the use of the truck for other purposes.

In U.S. Pat. No. 3,300,068 granted Jan. 24, 1967, to Fred K. Tarrant, Sr. for a tailgate attachment there is shown an attachment which may be connected to the rear end of a truck, the attachment being pivoted at the end of the truck and having leveling arrangements to maintain the attachment always in a level position and which included a spinner assembly rigidly connected to the attachment. While such an attachment has proved to be extremely useful, one problem encountered was that the tailgate of the truck must be removed and be replaced with a rear panel which is part of the material spreader of the attachment. When the truck was thereafter to be used for other purposes the entire attachment had to be removed and the tailgate replaced.

It is an object of our present invention to provide a new and improved material spreader which can be attached to a dump truck without requiring removal of the tailgate.

It is another object of our invention to provide a new and improved material spreader of the tailgate type which permits use of the truck to which it is attached for either spreading material or conventional dump truck purposes.

It is still another object of our invention to provide a material spreader for a dump truck in which the spinner which spreads the material always remains in a horizontal position despite elevation of the dump truck body.

In its broadest aspect our invention consists of providing a hopper for a dump truck which is pivotally connected to the rear of the truck body in a normally fixed position and includes a transverse conveyor and a spinner assembly to receive material from the conveyor, the spinner assembly being so supported that it is self-leveling and always maintains a horizontal position. An important feature of our invention consists in the use of a cover for the conveyor of the tailgate assembly which in its closed position forms a substantially uniform continuation of the truck body and in its open position directs material to the conveyor which supplies the spinner assembly with material to be spread. The conveyor cover includes a pressure plate which is operative to indicate to the driver of the truck when the spreader needs more material.

Further objects of the invention will be apparent from the following specification taken in connection with the drawings which form a part of this application and in which:

FIG. 5 is a side view showing details of the spinner assembly of the endgate spreader.

FIG. 7 illustrates details of an adjustable flow gate of the spreader.

Figure 1:
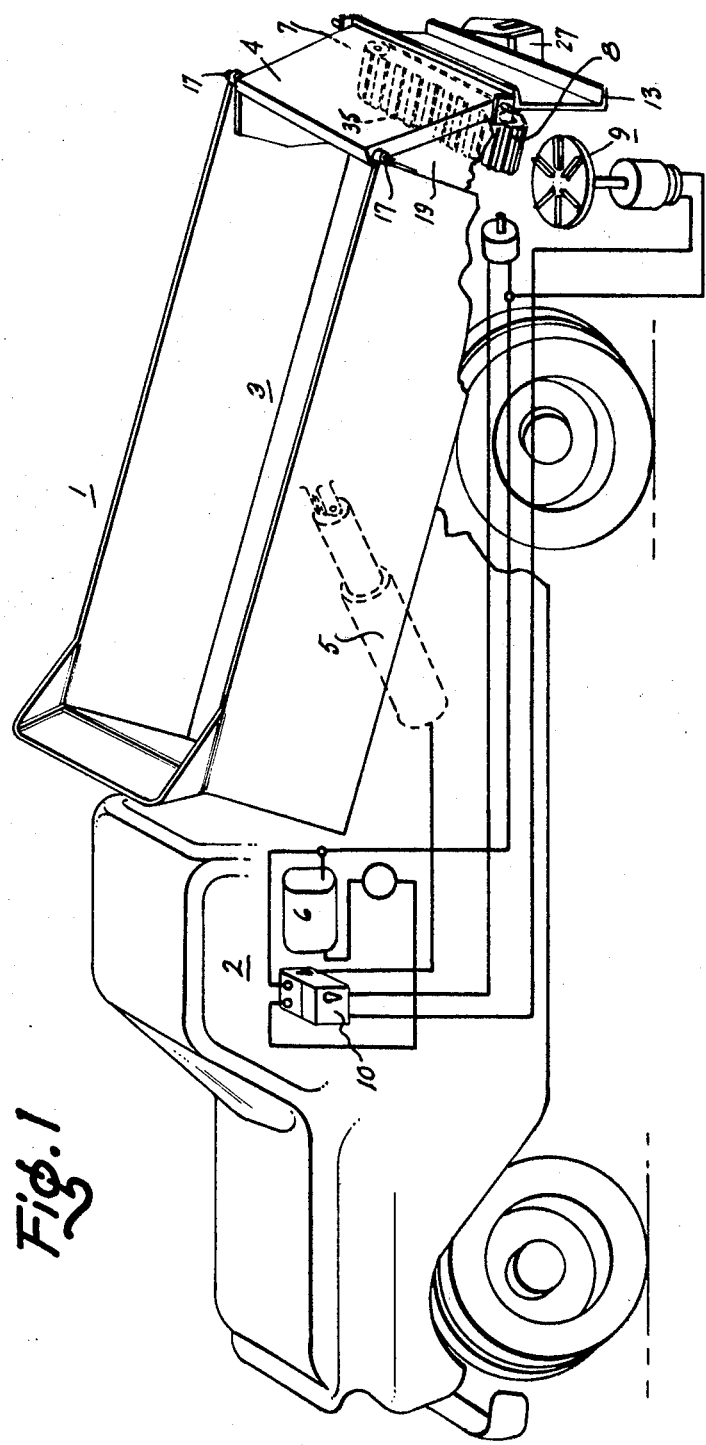
FIG. 1 is a perspective view of a dump truck employing the endgate spreader of our invention.

The truck 1 shown in FIG. 1 is of the dump type and includes a cab 2, a body 3, and a tailgate 4. Body 3 can be elevated by means of a body hoist cylinder 5 supplied with an operating hydraulic fluid from a tank 6. The endgate spreader 7 of our invention is shown attached to the rear end of the truck body 3 and includes a transverse conveyor 8 and a spinner assembly 9. Located within cab 2 is a bank of hydraulic controls 10 for operating not only body hoist cylinder 5 but also conveyor 8, reversible motor 24, and spinner assembly 9.

Figure 2:
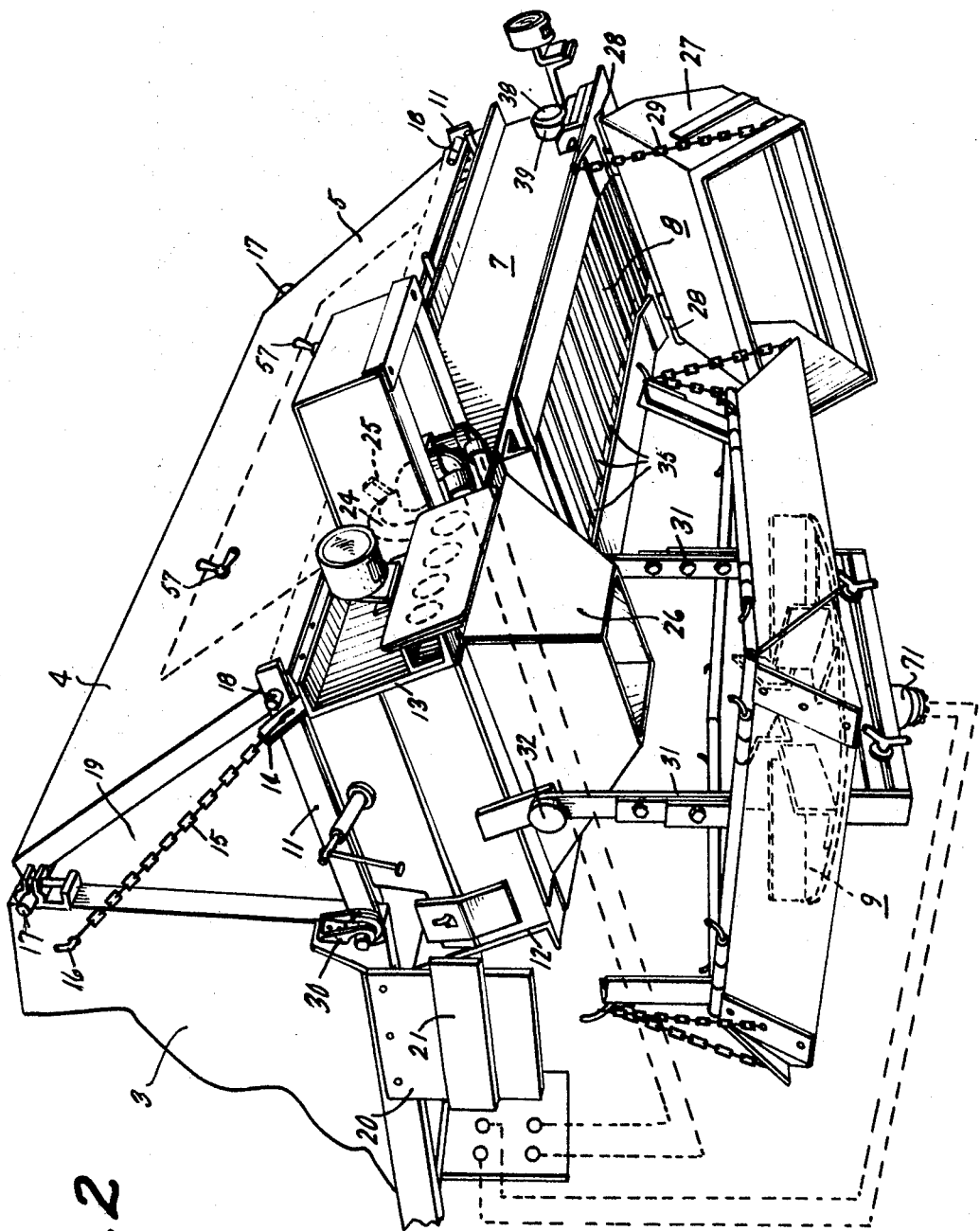
FIG. 2 is a perspective view of the endgate spreader of FIG. 1.

The endgate spreader of our invention is shown in FIG. 2 and comprises a hopper formed by a pair of parallel channel members 12, 13 joined together by an additional channel member 80 which is welded to the webs of channels 12, 13 and forms a plate between members 12, 13. Lugs 14 are welded to the upper end of channel 13 and are connected by means of chains 15 to chain slots 16 in truck body 3. Chains 15 thus function to provide means for maintaining the hopper with the spreader therein at a desired angle, preferably of the order of about 22°, with respect to the floor of truck body 3 when used for spreading. For normal use tailgate 4 of the truck is pivotally supported at its upper end in a conventional manner by pin 17. Tailgate 4 is shown in an open position and its lower end is secured in this open position with adjustable arms 11 which connect tailgate pin 18 to tailgate locks 30. Attached to tailgate 4 are transverse shield members 19 which extend into the body of the truck and are in closely spaced parallel relation with the inner sidewalls of the truck body when the tailgate is in closed position. When the tailgate is in the open position shown in FIG. 2, shields 19 form extensions of the sidewalls of the truck and function to contain materials within the truck.

Figure 3:
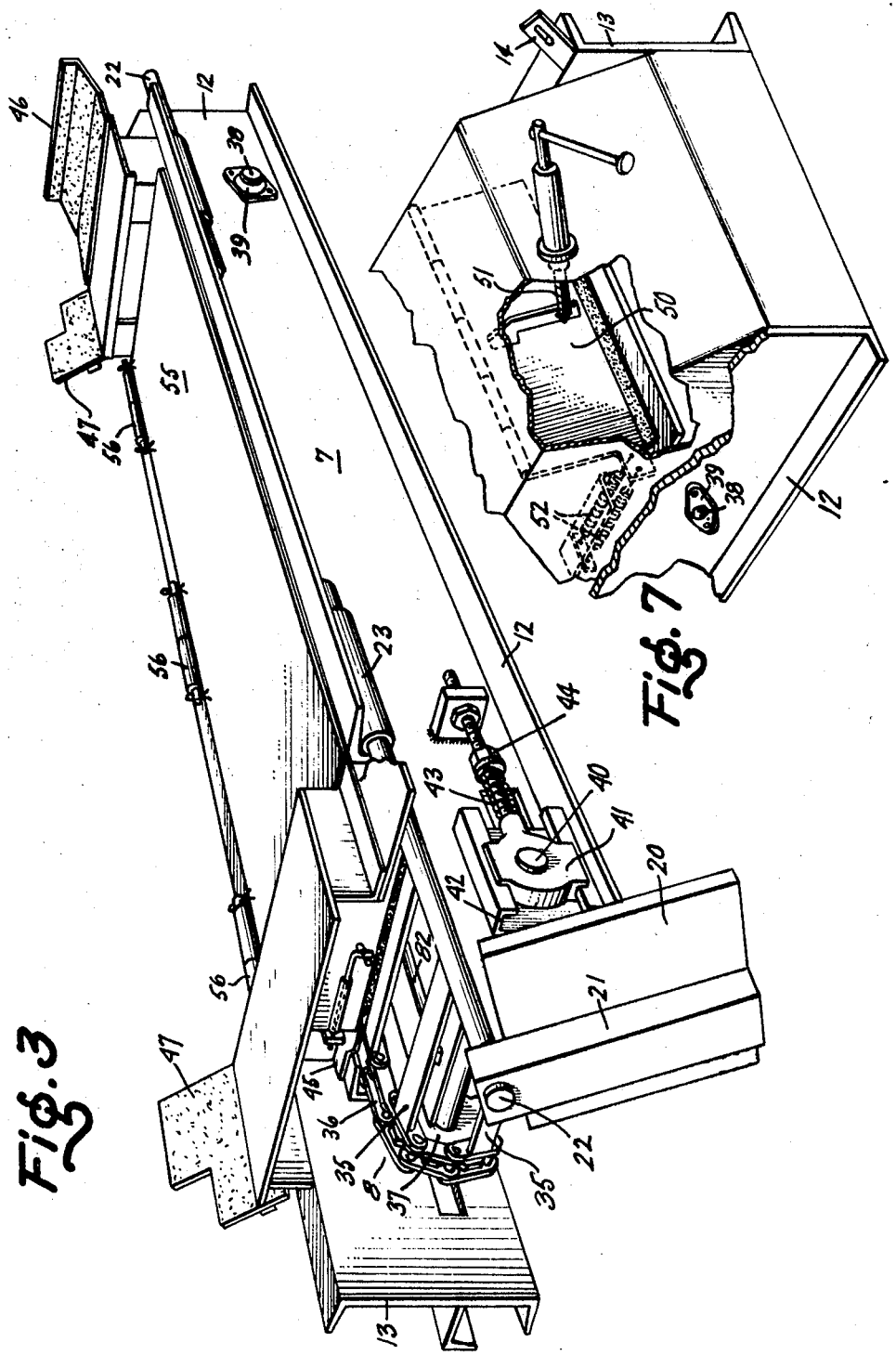
FIG. 3 is a perspective view, partly in section, of the conveyor employed in the spreader of FIG. 2.

The endgate spreader at its forward end is attached to the truck body by means of hanger plate assemblies each comprising a plate 20 which is bolted to the frame of the truck and a channel 21 which is welded to plate 20. As is seen in FIG. 3, channel 21 journals a rod 22 which fits within a sleeve or socket 23 welded to channel 12. Preferably channel 21 is welded to plate 20 after the endgate spreader has been supported in the proper position at the rear of the truck with which it is to be used. In this manner the spreader may be readily fitted to trucks of varying size so that the spreader functions as an extension of the bottom of the truck body. Sleeves 23 and rods 22 permit fitting the spreader to trucks of varying width while channels 21 permit height adjustment.

The endgate spreader as shown in FIG. 2 includes a transverse conveyor 8 of the bar flight type which is driven by means of a reversible hydraulic motor 24 through a torque arm 25 to deliver material to be spread to either a first discharge chute 26 and spinner assembly 9 or a second discharge chute 27 pivotally connected to bottom flanges of channels 12 and 13 by means of pins 28. Reversible motor 24 is connected by conventional hydraulic lines to a conventional reversing valve which is mounted in cab 2 as a part of the bank of hydraulic controls 10 or if desired can be mounted on spreader 7. At either location the truck operator can cause the conveyor to run in either direction or be jogged, as desired. As is well known to those familiar with spreaders of this type, spinner assembly 9 is used to spread materials such as sand, salt, or other granular materials to a road while discharge chute 27 is used to discharge suitable material to the shoulder of the road. When not used for discharging material to the shoulder of the road chute 27 may be maintained in an elevated position by means of chains 29 or completely removed.

In accordance with our invention spinner assembly 9 is suspended in a self-leveling manner from the endgate attachment by means of adjustable hangers 31 and hanger pins 32. In this manner even though the truck body may be raised to discharge material to the conveyor and spreader, the spreader assembly itself rotates on pins 32 and is always maintained in a horizontal position so that even and controlled spreading of material is obtained.

The bar flight conveyor illustrated in FIG. 3 comprises a plurality of transverse bars 35 extending between conveyor chains 36. The conveyor chains are driven in a conventional manner by means of two pairs of sprockets 37 at the respective end of the conveyor. At one end the sprockets are carried on a shaft 38 supported in bearings 39 mounted on channel 12, shaft 38 being driven by hydraulic motor 24. At the opposite end sprockets 37 are carried on a shaft 40 supported in an adjustable, spring loaded idler bearing 41 which rides in tracks 42. Suitable tension in the conveyor chains is maintained by means of a spring 43, which engages an external protuberance (not shown) on bearing 41 and an adjusting screw and locknut combination 44.

The conveyor chains are provided with a protective guard 45 to reduce the amount of spread material which can reach the chains and hinder chain operation. We also provide a sealing arrangement for the spreader to prevent loss of material to the sides and rear of the truck and which comprises rubber seals 46, 47 which engage respectively the shields 19 and endgate 4.

We control the rate of spread of material by means of a spring-loaded flow gate 50 (FIG. 7) whose opening is adjusted by means of a conventional threaded rod and threaded collar or nut combination 51, the rod passing loosely through a hole in the cover for the hopper and the collar acting as a stop when it engages that cover. Flow gate 50 normally limits the rate of delivery of material from the conveyor to the spinner assembly 9 to a desired amount determined by the adjustment of rod 51. However when an obstruction such as a large stone or a lump of material reaches flow gate 50, the threaded rod pushes through the hole in the cover and permits the flow gate to yield under the accompanying pressure to permit passage of the obstructing object. Tension coil spring 52 then automatically returns the flow gate to its prior position after such passage to continue to limit delivery of material to the chute 26 and spinner assembly 9 to the desired rate.

Figure 4:
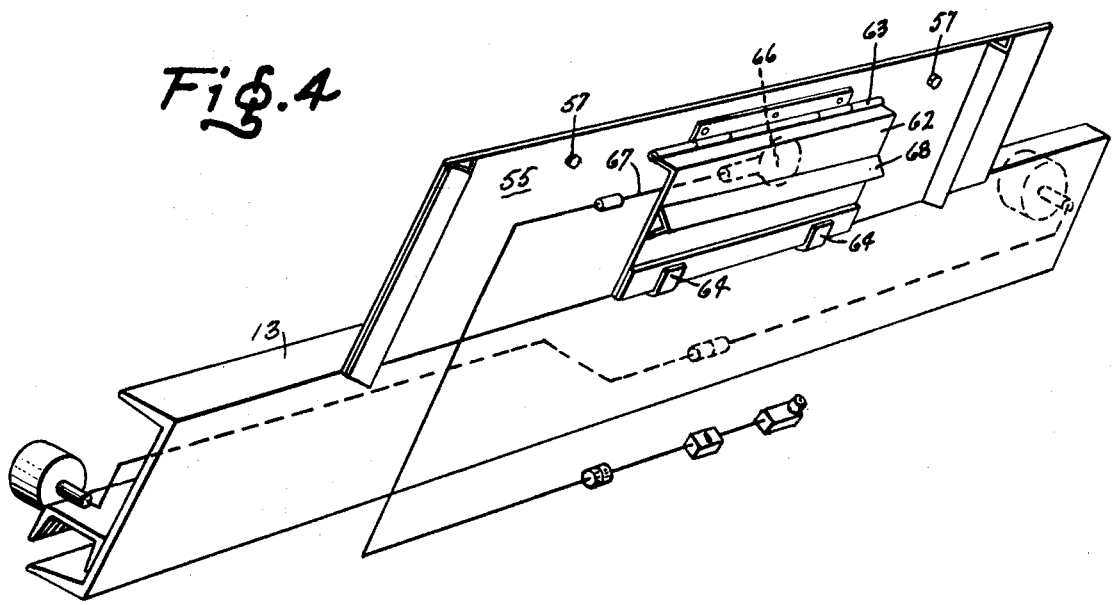
FIG. 4 is a perspective view, partly in section, of the cover plate for the conveyor of FIG. 3.

FIG. 4 illustrates the details of a cover plate 55 for conveyor 8. In this figure the cover plate is shown in its open position as contrasted with the closed position shown in FIG. 3. The rear end of cover plate 55 is connected to channel 13 by means of a hinge 56 and in its open position is attached to tailgate 4 by means of bolts and wingnuts 57. Gasket 60 (FIG. 6) is provided on the spreader attachment to overlie connecting pins 22 and sleeves 23 attached to the truck body. In this manner gasket 60 presents a smooth uniform surface which functions as a continuation of the bottom of the dump truck, so that, when the cover 55 is in its closed position and rests on the top lip of channel 12, the truck may be used for conventional purposes, such as hauling and dumping materials.

In the open position shown in FIG. 4, cover 55 functions to provide a signal to the truck operator of the level of the material within the truck. For this purpose cover 55 is provided with a sensor plate 62 which is connected by means of a hinge 63 to cover 55. The lower end of sensor plate 62 is maintained in a relatively loose, freehanging position by means of retaining tabs 64. Positioned between sensor plate 62 and cover 55 is a pressure switch 66 which is connected by means of a wire 67 to a buzzer or other indicator contained in the cab of the truck or at any suitable location. Pressure switch 66 is of the normally closed type and is moved to an open position by the weight of spread material within the truck. A flange 68 attached to sensor plate 62 assists in causing material within the dump truck to actuate the load-sensing arrangement. When the spread material falls below a predetermined level the sensor plate swings downwardly to release pressure from pressure switch 66 causing it to move to its closed position and actuate the signal.

The spinner assembly 9 illustrated in FIG. 5 comprises a bracket 70 which extends between adjustable hangers 31 to support an hydraulic spinner motor 71 employed to rotate a spinner disc 72 which carries a plurality of vanes 73. Dual conduit lines 74 which supply the hydraulic fluid to motor 71 are connected to hydraulic control bank 10 in the cab of the truck. A plurality of adjustable material deflectors 75 are hingedly connected to a frame 76 supported by hangers 31 and are provided with rubber guards 78 attached to adjacent deflectors. The positions of the individual deflectors or baffles 75 may be adjusted by means of chains 77 to obtain the desired spread pattern for the spinner assembly. As shown in FIG. 2, hangers 31 are adjustable by means of bolts in the multiposition hanger rods to the desired distance from the ground. In this way the height of the spinners and the spinner assembly and vanes above ground can be adjusted as desired.

Figure 6:
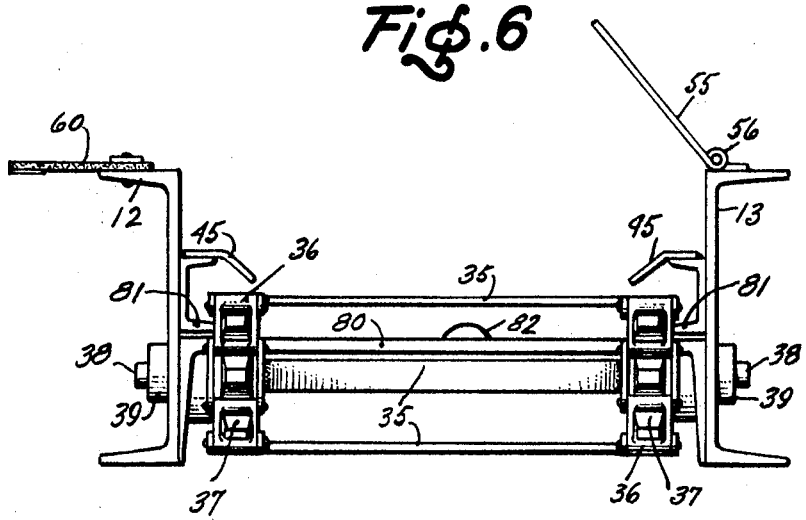
FIG. 6 illustrates certain details of the conveyor of FIG. 3 and the limiting support for its bars.

FIG. 6 shows the relative positions of channels 12, 13 and an interconnecting channel 80 which forms a plate between the two levels or flights of the conveyor. Chains 36 of the conveyor ride within channels 81 welded to the webs of channels 12, 13 and support the conveyor comprising chains 36 and crossbars 35 in a position well elevated above the web of channel 80. While normally such crossbars move above and below the plate formed by the web of channel 80 and are in spaced relation to that plate we provide a deflection-limiting member 82 to limit the vertical deflection of bars 35 when they are depressed or deflected under an abnormally heavy load in the hopper. Member 82 may be semicircular in cross section, extends the full length of channel 80, and is normally not in contact with bars 35. By limiting the vertical depression of bars 35 when they are deflected under an abnormally heavy load member 82 prevents the formation of permanent curvature of such crossbars which might occur when the elastic limit of the crossbars might otherwise be exceeded by an abnormal load.

In installing the endgate spreader to a particular truck, plate 20 is attached to the side rails of the truck and the spreader is raised by means of a hoist to a position where the spreader is against the rear of the dump body as high as possible with sealing strip 60 upfolded under the lip of the dump floor body. When the sealing strip is properly folded forward the spreader is pushed as close to the dump body as possible to provide proper sealing. Rods 22 are inserted in sleeves 23 after passing through holes provided in channel 21. Channel 21 is clamped to plate 20 and welded securely to that plate. Thereafter tailgate 4 is held open by using its pins 18 secured to arms 11 and the spreader-holding chains 15 are attached to slots 16 at the rear of the dump body, the length of chains 15 being adjusted so that the tailgate is continued to be held open in the same position when any hoist or other supporting arrangement is removed. Thereafter, the chains provide adequate support for the spreader. When it is desired to use the truck for normal dumping purposes, cover 55 is fitted over the conveyor portion of the spreader and chains 15 are loosened sufficiently to allow the spreader to be held slightly below the horizontal position. The tailgate then is able to be closed and the spreader raised to a horizontal position. The truck is then in a condition for use for normal dumping purposes.

From the foregoing descriptions of our invention it is apparent that it provides an endgate attachment for a truck which permits use of the truck not only for the spreading of material such as sand, cinders, and the like but also for other normal trucking purposes such as hauling and dumping without requiring removal of the attachment. The tailgate is not removed but instead is employed as an end wall which extends over the endgate attachment to contain material at the truck rear and direct it to the conveyor contained in the attachment when used for spreading.

An important advantage of our invention is that the spinner assembly, being pivoted, always remains parallel to the ground regardless of angle of the truck's dump body. In this way an even, continuous spreading action is obtained despite elevation of the truck to assist in discharge of the material. For this purpose the spinner assembly and the deflectors thereon are adjustable in height so that the endgate attachment is applicable to trucks of varying heights and body sizes. The adjustability of the supporting arrangement for the attachment together with the pivotable connection provided by the rods 22 and sleeves 23 facilitates the installation of the endgate attachment to trucks of varying widths and dimensions.

Still another important advantage of our improved endgate attachment is that, by employment of a reversing valve at any suitable location, the direction of motion of the endless conveyor can be reversed or jogged as desired in either direction to facilitate discharge of the spread material to the spinner assembly or to the shoulder discharge chute. An important advantage in this connection, so far as the driver of the truck is concerned, is that the material sensor attached to the cover for the conveyor of the attachment provides him an instant signal whenever the material in the truck is reduced to an undesired level.

While we have shown certain specific embodiments of our invention and described them, it is evident that the invention is capable of other modifications and further changes in its construction and arrangement of parts without departing from the spirit and scope of the invention as covered by the following claims.

What we claim as new and desire to secure by Letters Patent of the United States is:

1. A material spreader for a dump truck of the type having a cab, a body with a tailgate, and body-hoisting means, the tailgate being pivoted at its upper end at the rear end of the truck body, comprising a hopper having a front end attached by pivotal connection at the rear end of the truck at its bottom, means for maintaining said hopper at a desired angle with respect to the bottom of the truck, means for securing the bottom of the tailgate in an open position so that it extends over said hopper, a conveyor in said hopper extending transversely of the longitudinal axis of the truck, and a cover connected to said hopper and movable from a position where it covers said conveyor, permitting the truck to be used as a conventional dump truck, to a position where it is attached to the tailgate of the truck so that the conveyor is uncovered and the truck may be used for the spreading of material.

2. The material spreader of claim 1 which includes a self-leveling spinner member pivotally connected at one side of said hopper to receive material to be spread from said conveyor, whereby when the truck body is raised to deliver material to the conveyor the conveyor remains at said desired angle with the bottom of the truck body while the spinner member is parallel to the ground for all positions of the truck body.

3. In the material spreader of claim 2 a discharge chute hinged at the other side of said hopper to receive material from said conveyor, hydraulic motor means connected to operate said conveyor, and valve means for reversing said motor to permit discharge of material selectively to the spinner member or the discharge chute.

4. The material spreader of claim 3 in which the conveyor has a drive shaft, said hopper comprises a pair of spaced opposed channel members, a torque arm is connected to one of said channel members, and said hydraulic motor means is mounted on said torque arm and is connected to said shaft.

5. The material spreader of claim 4 in which said hopper comprises a pair of spaced members, said drive shaft extends between said members and is supported in a pair of bearings carried by said members, an idler shaft for said conveyor, a second pair of bearings for said idler shaft, and spring means engaging said second bearings for maintaining tension in said conveyor.

6. In the material spreader of claim 1, a pair of parallel vertical members forming said hopper, a plate extending between said members, channels attached to said vertical members above said plate, said conveyor having crossbars movable transversely of the longitudinal axis of the truck and chains connecting said crossbars, said chains being supported by said channels for moving said crossbars above and below said plate in spaced relation thereto, and a movement limiting member attached to the upper surface of said plate and extending longitudinally thereof, said last named member being normally spaced from and out of contact with said crossbars and limiting the vertical depression of the bars when they are deflected under an abnormally heavy load in said hopper to prevent the formation of permanent curvature of said crossbars.

7. In the material spreader of claim 6 material flow gates positioned at the opposite ends of said conveyor, rate adjustment means attached to the flow gate adjacent said spinner member, and tension means connected to said gate whereby said flow gate normally limits the rate of delivery of material from said conveyor to said spinner to a desired amount but is movable in the presence of an obstructing object on the conveyor to permit passage of such object, said tension means returning said flow gate to its prior position after such passage.

8. The material spreader of claim 1 in which said conveyor cover plate has a sensor plate attached to its lower surface and a pressure switch positioned between said sensor plate and said lower surface, and means connected to said switch for actuating an indicator whereby when said conveyor cover plate is attached to the tailgate of the truck the pressure of material to be spread against said sensor plate normally prevents actuation of the indicator but the absence of material to be spread causes the pressure switch to actuate the indicator.